United States Patent Office 3,713,836
Patented Jan. 30, 1973

3,713,836
PROCESS OF PRODUCING A COMPOSITION FOR CONTROLLING THE BACTERIAL FLORA IN THE INTESTINES OF ANIMALS
Carl Gosta Carlsson, Angelholm, Sweden, assignor to AB Cernelle, Angelholm, Sweden
No Drawing. Filed Mar. 10, 1970, Ser. No. 18,303
Claims priority, application Sweden, Oct. 13, 1969, 13,996/69
Int. Cl. A23k 1/00
U.S. Cl. 99—2 VM
8 Claims

ABSTRACT OF THE DISCLOSURE

A composition is prepared by cultivation of a strain of *Streptococcus faecium* in an aqueous nutrient medium under anaerobic conditions. The resulting bulk of bacteria is separated and possibly subjected to freeze-drying. The composition is administered to domestic animals and is capable of controlling the bacterial flora in the intestines, resulting in an increased growth of the animals.

---

This invention relates to a process of producing a composition for controlling the bacterial flora in the intestines of animals.

The characteristic features of the process according to this invention comprise cultivating in an aqueous nutrient medium containing carbohydrates, a source of organic nitrogen and a source of growth substances, under submerse anaerobic conditions a strain of *Streptococcus faecium* herein designated "*Streptococcus faecium* Cernelle 68" the properties of which are specified in the specification (this strain has been deposited in the National Collection of Industrial Bacteria, Torry Research Station, Aberdeen, Scotland registration No. NCIB 10 415), separating the resulting bulk of bacteria from the cultivating liquid thus obtained, and possibly freeze-drying the isolated bulk of bacteria.

The organism utilized in the process according to the present invention is a sub-culture which was originally obtained under the classification of *Lactobacillus acidophilus*. The initial identification hypothesis was eliminated on the grounds of microscopical characteristics of the organism and also the high tolerance to heat it showed. However, the morphological picture was somewhat confusing since the cells are rather irregular and therefore show a greater similarity to Microbacterium than to Streptococcus. The negative results of the benzidine test, however, led to the exclusion of the former alternative, and the ability of the strain studied to grow at 10° C. gave another negative indication. It was therefore concluded that, despite the morphological irregularity, the organism was a streptococcus and more particularly a streptococcus belonging to the enterococcus group (high heat tolerance, growth at 10° C. and at 45° C.). Other tests confirmed this conclusion. It could thus be demonstrated that the organism is capable of growing on Slanetz' and Bartley's agar. For these and other reasons the organism must be considered as an enterococcus. The following properties could also be demonstrated: Growth at pH 9.6, growth in media with a NaCl concentration of 6.5%, and growth in 40% bile agar. All the said properties are usually regarded as specific identification criteria for enterococci. In order to obtain comparative information, all tests included a strain of *Streptococcus durans* (ATCC 6056) which belongs to the enterococcus group, and also some enterococcus strains specially isolated for the purpose from manure.

An extensive agreement was found to exist between the strain of *S. durans* and the strain studied, and it was therefore assumed preliminarily that the two strains were identical. However, continued searches in the literature on this subject and also comparative studies evidenced that in greater probability the organism could be characterised as *Streptococcus faecium* (according to Deibel, Bact. Reviews 28, 330–366, 1964, *S. durans* may be regarded more particularly as a variant of *S. faecium*). This conclusion was mainly based on the fact that the strain studied grows at 50° C. and ferments arabinose, whereas it does not ferment sorbitol and does not utilize citrate as a carbon source. The four characteristics reported agree with *S. faecium*, but not with *S. faecalis*. As implied above, it is of minor importance whether the organism is classified as *S. durans* or as *S. faecium*.

Compared to the reference strain *S. durans* which is heavily β-haemolytic, the strain studied must be regarded as practically non-haemolytic. Therefore, also from this aspect the classification of the strain as *S. faecium* must be considered correct. Moreover, the strain studied does not coagulate milk. The formation of acid in milk is weak, for instance compared to the reference strain *S. durans*. The final pH in milk was 5.5 and 4.4, respectively.

It should be pointed out that *Streptococcus faecium* has not been recognized as an individual species in the last edition of Bergey's Manual of Determinative Bacteriology (edition 7, 1957). Many studies carried out during the last few years, however, have strongly indicated the need for a revision of the enterococcus group in Bergey's Manual, and that this group should consist of two different species, *Streptococcus faecalis* and *Streptococcus faecium*. *S. faecium* is most readily differentiated from *S. faecalis* in that the former requires folic acid but not the latter.

An investigation into the morphologic and cultivating properties of *Streptococcus faecium* Cernelle 68 has given the results which are summarized in the following table:

| Medium, etc. | Properties |
|---|---|
| Morphology; Lemco agar, blood agar and broth. | Gram positive cocci, often lanceolate. Singles, pairs and chains of varying length. Non-motile. |
| Growth: | |
| Cultivation temperature | 30–45° C. |
| Temperature range | 15–45° C. (higher than 45° C. not examined). |
| H₂ atmosphere, blood agar | Good growth, 7 days at 30° C. |
| Blood agar, 24 h. at 25° C. | Punctiform colonies. Circular, smooth, moist, low convex. Margin entire. Opaque and colourless. Butyrous, β-haemolysis. |
| Carbohydrates in peptone water (7 days at 30° C.). | Acid but no gas from glucose, sucrose, lactose, maltose, mannitol and trehalose. Neither acid nor gas from starch, glycerol and dulcitol. |
| Hugh and Leifson, glucose (7 days at 25° C.). | Acid in open and closed tubes. |
| MRS "sloppy" agar | Good growth. No gas bubbles with hot wire—homofermentive. |
| Litmus milk | Acid, no clotting or separation. |
| Urea | − (weak growth). |
| Citrate (Koser's) | −. |
| Indole | −. |
| Voges-Proskauer | +. |
| Methyl red | +. |
| Nitrate to nitrite | −. |
| NH₃ from tryptone | −. |
| Gelatine agar plate | −. |
| Starch agar plate | −. |
| Milk agar plate | Clearing, but precipitation with HgCl₂. |
| Catalase | −. |
| Cytochrome oxidase | −. |
| Oxidase (Kovac's) | − (30 seconds). |

Cultivation tests carried out with *Streptococcus faecium* Cernelle 68 have shown that the following ten amino acids are necessary growth factors for this strain: arginine, glutamic acid, glucine, histidine, isoleucine, leucine, methionine, threonine, tryptophan and valine. Four B-vitamins were important growth factors: riboflavin, niacin, pantothenic acid and folic acid.

Determinations of the resistance of the organism in vitro gainst some antibiotics and chemotherapeutics gave the following results:

Antibiotics and chemotherapeutics: Group
(1) Sulfaisodimidin _____ IV
(2) Penicillin _____ III
(3) Ampicillin _____ III
(4) Streptomycin _____ IV
(5) Chlortetracyclin (Aureomycin) _____ II
(6) Oxitetracyclin (Terramycin) _____ I
(7) Chloramphenical _____ II
(8) Polymyxin _____ IV In the above table the different groups have the following meaning:

Group I: "Susceptible" (common infection, usual dosage)
Group II: "Fairly susceptible" (common infection, high dosage)
Group III: "Little susceptible" (localized infection, concentration of chemotherapeuticum on the site of the infection—example urinary tract infections)
Group IV: "Resistant" (probably not accessible to chemotherapy).

The strain Streptococcus faecium Cernelle 68 has been deposited in the National Collection of Industrial Bacteria, Torry Research Station, Aberdeen, Scotland and has there been registered under No. NCIB 10 415.

The invention comprises cultivating a new strain of Streptococcus faecium, herein designated S. faecium Cernelle 68, under submerse anaerobic conditions at 30–45° C., preferably 34–40° C., under stirring in medium containing carbohydrates such as dextrose, a source of organic nitrogen, such as peptone, and a source of growth substances, such as yeast extracts. The cultivation preferably takes place at a pH of 5.8 to 7.2, monium hydride being preferably used as a pH regulator. The time of cultivation amounts to 10 to 30 h. Optimum conditions are 37° C. in 16 h.

When the growth has been completed the bulk of bacteria is separated, preferably with the aid of a separator and is suspended preferably in water, freeze-dried and packaged.

The bacterium produced according to the present invention has the ability of multiplying in the intestines of animals and can therefore be used as an addition to animal feeds, particularly for preventing enteritis.

The organism in question forms lactic acid, is natural to the intestines and has so high a viability that it suppresses other intestinal bacteria and thereby normalizes the intestinal flora.

When the composition according to the present invention is mixed into animal feeds it produces biologically a physiologic effect which gives the same results as, or between results than, feed antibiotics which are often admixed to animal feeds. It reduces the intestinal infections and increases the growth of the animals per weight unit of feed. At the same time the number of feed days required for reaching a definite weight is reduced.

The composition has been found to be particularly advantageous for sucking-pigs and calves. The admixture of the composition to feeds instead of antibiotics has proved to result in the sucking-pigs reaching their sales weight much earlier than would have been the case without any admixture.

The composition can therefore be used as a substituent for antibiotics and chemotherapeutics in feeds. This is of great importance since this will prevent antibiotic-resistant bacteria strains from developing, which often happens upon admixture of antibiotics to feeds. The antibiotic-resistant strains thus developed constitute an increasing problem within human medicine.

An example is given in the following to illustrate the cultivation of Streptococcus faecium Cernelle 68 and the collection of the product.

EXAMPLE

The culture of S. faecium Cernelle 68 is maintained preferably as stab culture in tomato juice agar cooled to 5° C. The tubes are restabbed once a month on new sterile tubes. After a growth has emerged a test is controlled with gram dyeing and smearing on a tomato juice agar plate and nutrient agar plate.

A preculture was prepared by weighing of

|  | G. |
|---|---|
| NaCl | 5 |
| Peptone | 10 |
| Extract of meat | 3 |
| Dextrose | 5 |

Water, 1000 ml.

which was divided onto four 250 ml. Erlenmeyer flasks and sterilized for 20 minutes at 121° C. Under sterile conditions a platinum loop was transferred from the culture to the broth. Incubation at 37° C. during 24 h. After growth control was effected by gram dyeing, smearing on a tomato juice agar plate and in a phase contrast microscope.

A neutralizing solution of 6% $NH_4OH$ was prepared and sterilized through Seitz sterile filter type EKS I. Connected to the flask with $NH_4OH$ in a sterile manner was a glass tube having a hose for connection to a hose pump.

17 litres of substrate were prepared for batchwise cultivation by weighing of

|  | G. |
|---|---|
| Peptone | 510 |
| Dextrose | 765 |
| Yeast extract | 119 |

Water, 1700 ml.

The solid constituents were well solved in water and the solution was transferred to sterilizing vessels of stainless steel having a connection for urging the liquid in a sterile manner over into the cultivation vessel. The substrate was sterilized for 50 minutes at 121° C. (10 litres). For 40 minutes at 121° C. (7 litres). The cultivation vessel was sterilized at 180° C. for 4 h.

The substrate was urged by sterile air under pressure (0.5 atm.) from the sterilization vessels to the cultivation vessel. The inoculate was added. Deaeration of the vessel was performed in a sterile manner. The pH electrode was connected. The electrode was connected to a pH regulator. pH was maintained within the range of 5.8–7.2. The regulator sent pulses to the hose pump which supplied the $NH_4OH$ solution through the sterile connection to the vessel. A contact thermometer was connected to the vessel and the temperature adjusted at 37° C. The motor of the agitator was started and cultivation commenced.

Growth was allowed for about 16 h. and at constant pH and stirring. Initially the substrate was of dark colour and finally got a bright yellow hue. About 3000 mm. of 6% $NH_4OH$ were spent.

The finished culture was transferred to a separator and separated at 10,000 r.p.m. The bulk of bacteria separated in the separator was suspended under aseptical conditions. The suspension was freeze-dried at 0.01 mm. Hg for 20 h. The dry powder was packed into sterile glass jars.

The finished culture was checked in the microscope for gram dyeing and after growth on tomato juice agar, nutrient agar and VRA agar. The freeze-dried bulk was also controlled by cultivation experiments.

What I claim and desire to secure by Letters Patent is:

1. A process for preparing an animal feed having a supplement added thereto comprising a process for preparing said supplement including cultivating in an aqueous nutrient medium containing carbohydrates, a source of organic nitrogen, and a source of growth substances, under submerse anaerobic conditions a strain of Streptococcus faecium herein designated "Streptococcus faecium Cernelle 68," separating the resulting bulk of bacteria from the cultivating liquid thus obtained, and thereafter mixing said thereby produced supplement with said animal feed.

2. A process according to claim 1 wherein the cultivation is performed at from about 34° to 40° C. at a pH of from about 5.8 to 7.2 and for a time of from about 10 to 30 hours.

3. A process according to claim 2 wherein the cultivation is performed at about 37° C. for a time of about sixteen hours.

4. A process according to claim 2 wherein the pH is adjusted by means of ammonium hydroxide.

5. A process for preparing an animal feed having a supplement added thereto comprising a process for preparing said supplement including cultivating in an aqueous nutrient medium containing carbohydrates, a source of organic nitrogen, and a source of growth substances, under submerse anaerobic conditions a strain of *Streptococcus faecium* herein designated "*Streptococcus faecium* Cernelle 68," separating the resulting bulk of bacteria from the cultivating liquid thus obtained, freeze-drying said separated bulk of bacteria, and thereafter mixing said thereby produced supplement with said animal feed.

6. A process according to claim 5 wherein the cultivation is performed at from about 34° to 40° C. at a pH of from about 5.8 to 7.2, and for a time of from about 10 to 30 hours.

7. A process according to claim 5 wherein the cultivation is performed at a temperature of about 37° C. for a time of about sixteen hours.

8. A process according to claim 6, wherein the pH is adjusted by means of ammonium hydroxide.

References Cited

UNITED STATES PATENTS 3,123,538    3/1964    Shirota et al. _____ 195—96

OTHER REFERENCES

Diebel: Bacteriol. Rev., vol. 28 (1964), pages 336 and 350–354.

Diebel: Bacteriol. Rev., vol. 28 (1964), pages 330–335.

ALVIN E. TANENHOLTZ, Primary Examiner

U.S. Cl. X.R.

99—9; 195—96